INVENTORS
GRAYDON L. BROWN,
DONALD E. DUNSTER &
BY DOUGLAS S. SULLIVAN
William J. Miller
ATTORNEY

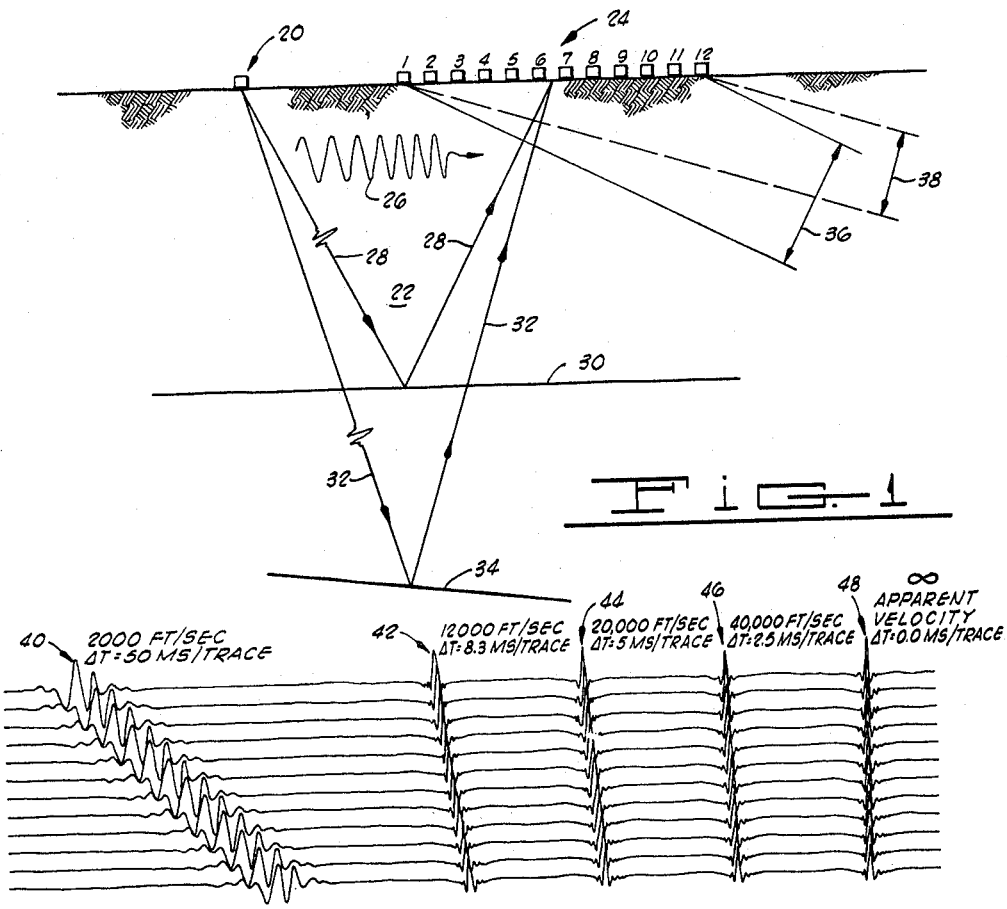

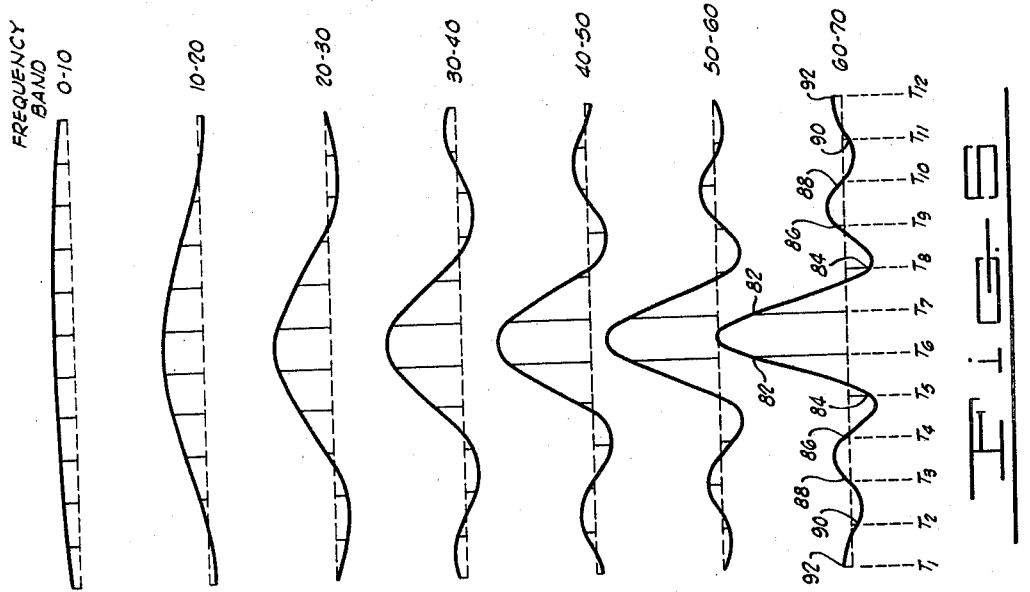
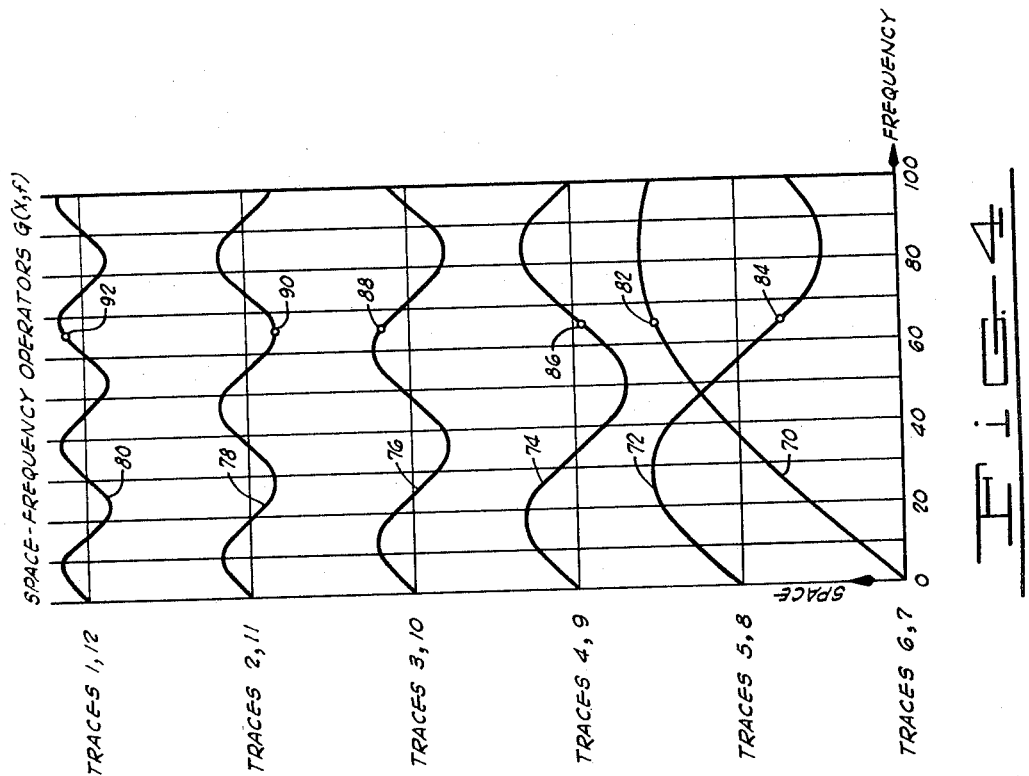

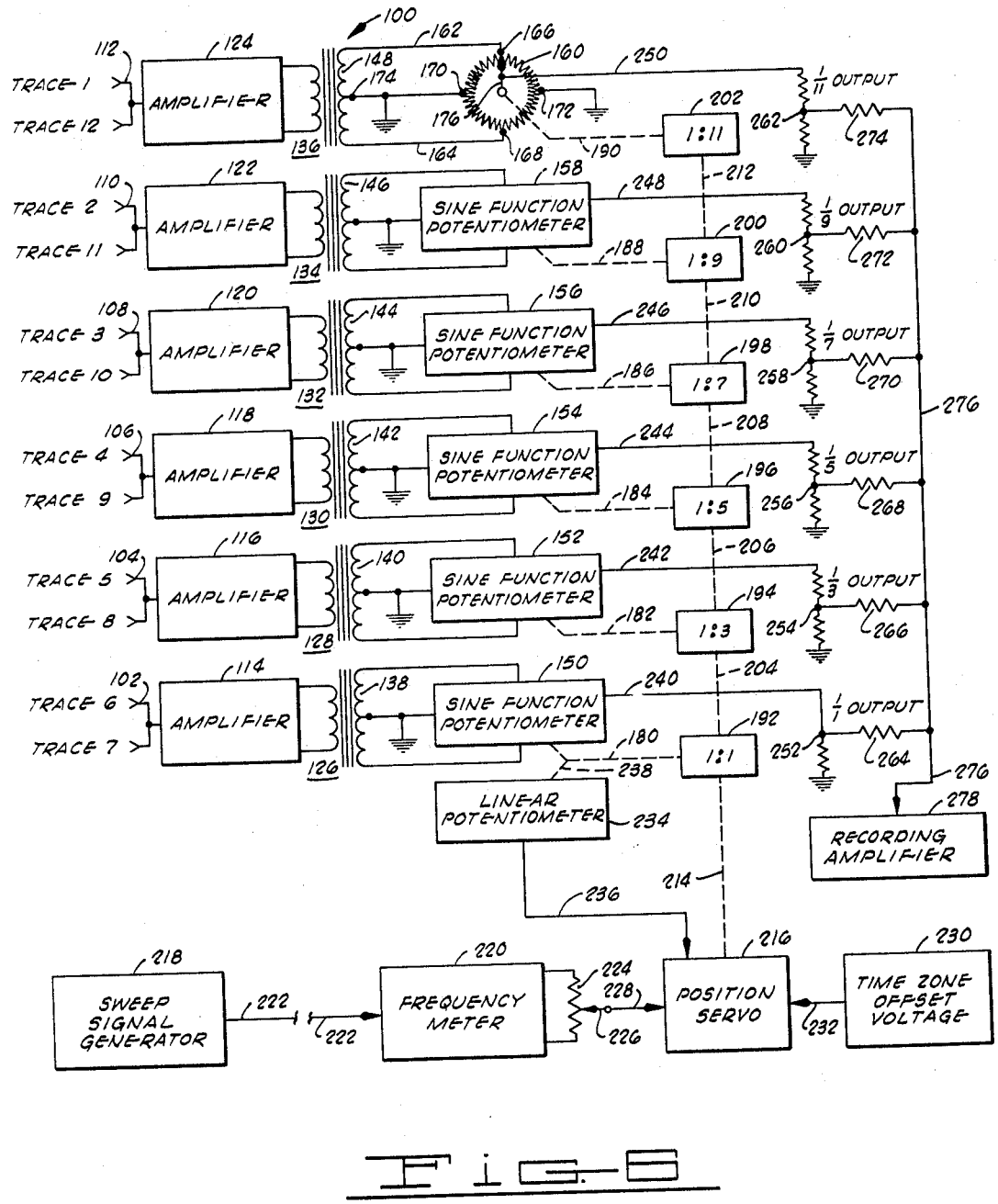

3,395,386
METHOD AND APPARATUS FOR WIDE BAND VELOCITY FILTERING
Graydon L. Brown, Donald E. Dunster, and Douglas S. Sullivan, Ponca City, Okla., assignors to Continental Oil Company, Ponca City, Okla., a corporation of Delaware
Filed Aug. 1, 1966, Ser. No. 569,171
12 Claims. (Cl. 340—15.5)

ABSTRACT OF THE DISCLOSURE

A seismic velocity filtering system which utilizes a controlled variable frequency seismic source and a detector array. Signals from detector pairs whose detectors are equi-distant from the center of the array are combined, the combined signals are weighted in accordance with a space-frequency operator, and the weighted signals are summed. The weighting function is time variable so that the effective length of the array is matched to the frequency of the detected seismic signal.

---

Figure 7:
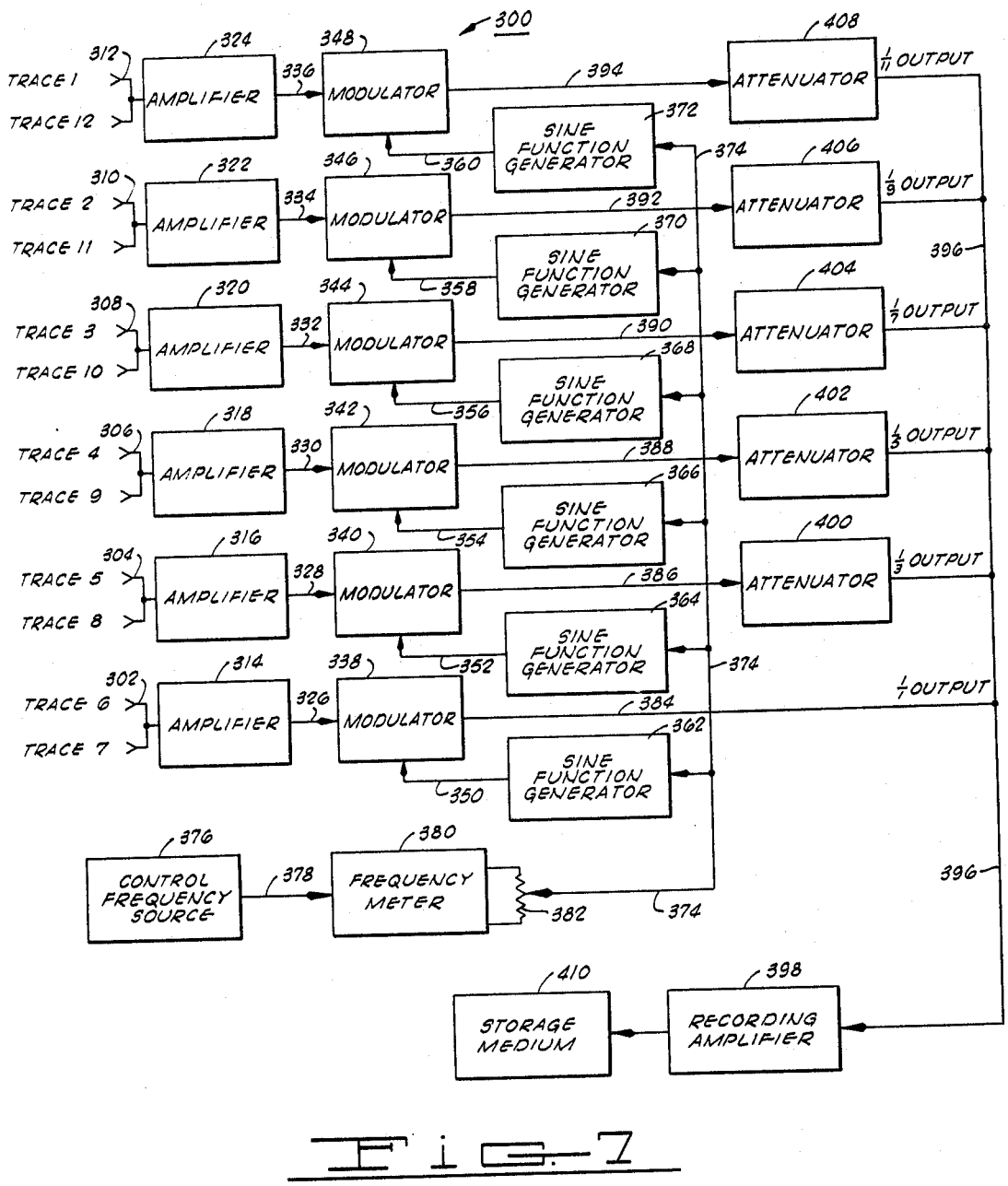

This invention relates to improvements in the art of geophysical prospecting, and more particularly, but not by way of limitation, it relates to an improved method and apparatus for performing wide band velocity filtering on multi-trace seismic signal returns as derived from a seismic detector array.

Velocity filtering is recognized as a valuable tool in the interpretation of seismic records. Its use enables very effective cancellation or great diminution of much undesired seismic signal return which appears on seismic records due to random noise, high velocity noise, ground roll, certain organized multiples and dipping events, etc. The concept of velocity filtering in itself is not new; however, the present method and apparatus enables velocity filtering either in the field, upon direct receipt of the seismic signals from a detector array, or the velocity filtering of previously recorded signals at a central processing laboratory.

The present method and apparatus is applicable to a vibrational type of geophysical prospecting system which generates an input seismic signal to the earth which is a continually varying controlled frequency input of predetermined duration. The seismic return signals received at a remote detector array can then be weighted or attenuated as a function of time in order to change the effective length of the detector array to properly complement the incoming seismic signals which will have a known or determinable frequency.

The present invention contemplates a method and apparatus for wide band velocity filtering whereby the seismic signals received by the individual units of the detector array are transformed and attenuated in accordance with a predetermined space-frequency operator to obtain the maximum rejection of seismic signals arriving at the detector array along undesired velocity paths. More particularly, the present invention contemplates the acceptance of seismic traces in predetermined pairs, the pairs being those seismic traces or channels detected at points equidistant from the center of the detector array; and then the respective pairs are weighted in accordance with the necessary space-frequency operator and, thereafter, the series of weighted traces is summed into a recording amplifier to produce a velocity trace output. The exemplary apparatus of the invention utilizes sine function potentiometers driven at a fixed ratio of frequency each with respect to the others and the basic frequency is synchronized from either the system sweep signal or that generated signal which controls the induced seismic input.

Therefore, it is an object of the present invention to provide a method and apparatus for performing wide band velocity filtering whereby the detector array is weighted as a function of time to change the effective length of the detector array at a rate which can be controlled to match the sweep rate of a returning vibrational seismic signal.

Further, it is an object of this invention to provide a method and apparatus for effecting wide band velocity filtering of multi-channel seismic signals within predetermined velocity cut-off points such that the filter is adjustable as to primary objective time, that is, a desired travel time for a particular subsurface point of interest.

Finally, it is an object of the present invention to provide a wide band velocity filter which performs its task rapidly and accurately and which can be employed directly in the field upon received seismic information, as well as in the processing laboratory upon pre-recorded seismic signals.

Other objects and advantages of the invention will be evident from the following detailed description when read in conjunction with the accompanying drawings which illustrate the invention.

In the drawings:
FIG. 1 is a diagram showing exemplary paths of seismic signal travel from a source to a detector array;
FIG. 2 is a twelve trace seismic record in ideal form to show the different apparent velocities of different record events;
FIGS. 3A, 3B and 3C show velocity trace records which would be derived from the FIG. 2 record at three different velocity cut-off points adjusted to have successively lower apparent velocity exclusion points;
FIG. 4 shows the space-frequency operators for a twelve trace record having a velocity cut-off value at 6 ms./trace;
FIG. 5 shows the weighted arrays for the different frequency bands as can be plotted from the space-frequency operator of FIG. 4;
FIG. 6 shows an exemplary apparatus in block diagram for carrying out the method of wide band velocity filtering; and
FIG. 7 is a block diagram of still another form of exemplary apparatus for carrying out the method.

First, a general treatment of the subject of velocity filtering is included to clarify as to the velocity concepts referred to and treated herein. The term "velocity" used in this regard refers to the apparent velocity with which a given signal arrives at the individual units of a detection array. For example, it should be apparent that more horizontally traveling signals will reach the closest seismometer unit of an in-line detection array appreciably before it reaches the more remote seismometer and, by the same token, a seismic signal reflected from a very deep strata will reach the individual seismometers of the detection array at almost the same time. Hence, the rate of signal travel can be derived relative to the detection array itself.

FIG. 1 shows a diagram of a geophysical sounding system with three separate ones of the multitude of propagation paths shown. The seismic source 20 generates energy which propagates into the earth 22 and the reflected seismic signals are picked up at a detection array 24. Horizontally traveling waves, trapped in the weathered layer and other near surface strata, are denoted by the wave configuration 26. A second path 28 illustrates the reflection of seismic energy from a relatively deep interface or horizontal bed 30, while a third signal path 32 is reflected from a much deeper interface or reflecting bed 34 for subsequent travel back to the detection array 24. Thus, a seismic signal traveling on path 28 is detected at detector unit No. 1 of detection array 24 at a time prior to its detection at detection unit No. 12 which is directly related to the distance 36 between lines normal to the propagation path 28. Similarly, lines drawn normal to the deep propagation path 32 indicate that a lesser distance 38 would be traveled during the time of signal detection across all units of the detection array 24.

The distance or travel time 36 and 38 can then be equated relative to the detection array as a difference in the apparent velocity of the seismic wave. That is, even though the actual velocity of seismic signals on paths 28 and 32 are very nearly the same, the apparent velocities as seen across the detection array 24, vary by almost a two-to-one ratio. This apparent velocity concept has been used for a considerable time in the design of common array type filters for cancelling certain dipping events, low velocity noise, and certain other forms of interference from multi-trace seismic records. In these previous uses, the apparent velocity concept could only be used for cancellation at specific frequencies of signal return as instrumented by particular wavelength spacing of the individual detector units in a detection array. However, in velocity filtering it is desired to have the equivalent of very many different detection array spacings, one for each frequency to be encountered in that portion of seismic return which it is desirable to cancel out.

FIG. 2 shows a twelve trace seismic record, idealized in form, which shows ground roll or surface waves 40 and a series of events 42, 44, 46 and 48 which have successively greater apparent velocities with respect to the particular detection array. It should be understood that a vibrational type of seismic record would be represented by a series of return pulses for each of the idealized pulses of FIG. 2 but the time relationships or order of occurrence would be identical.

Assuming that the twelve trace seismogram of FIG. 2 is taken from a detection array wherein the distance between the adjacent, linearly aligned detection units is 100 ft., the apparent velocities can be determined from the equation $$V_a = \frac{d}{\Delta t}$$

where $d$ is the spacing between detectors or the origins of adjacent traces of the record. Thus, with the low velocity waves of group 40 it can be determined from the seismogram that the signals are displaced 50 milliseconds per trace (any two adjacent traces) and it is known that the respective detection units are displaced by 100 ft. so that the apparent velocity $V_a$ of 2000 ft. per second can be derived. In the same manner, the events of group 42 can be determined to be at an apparent velocity $V_a$ of 12,000 ft. per second since like components of energy traverse any two adjacent seismometers which are spaced 100 ft. apart in the trace displacement interval or $\Delta t$ of 8.3 milliseconds per trace. The similar computation can be made with respect to events 44, 46 and 48, which exhibit increasing apparent velocities as indicated by the respectively decreasing trace intervals or $\Delta t$ per trace values. It should be noted too that the events of group 48 are approaching an apparent velocity of infinity whereat the slope of the event line across the seismogram becomes perpendicular to the horizontal axis of the seismogram.

The multi-trace seismic record of FIG. 2 is, of course, idealized and a usual field record is thoroughly masked over with vibrational signal series and random signals (noise, etc.) which render valid events difficult of determination. Thus, the use of a velocity filter will allow cancellation of all random signals as well as the cancellation of all ordered events which have apparent velocities below a pre-selected set of limits which define the cut-off velocity. That is, if a suitable velocity filter were applied which had a cut-off velocity setting or $\Delta t$ per trace of plus or minus 2 milliseconds per trace, then all ordered events having a lesser apparent velocity $V_a$ (greater $\Delta t$ per trace) would be cancelled out and only those events within the desired velocity passband would be passed or applied to the final velocity trace. It should be understood too that FIG. 2 represents ideal single pulse characteristics and in the case of vibrational sounding each of the individual events would be indicated by a series of controlled frequency pulses, each pulse of the series resulting from a predetermined input at the vibrational sounding source.

FIG. 3A shows an ideal velocity filtered trace as derived from the multi-trace recording of FIG. 2 with the application of a velocity filter having a 2 millisecond per trace cut-off velocity. The trace 50 passes the velocity pulse 52 indicative of the group of events 48, having a $\Delta t$ of zero, since their apparent velocity exceeds that of the cut-off velocity. Remaining random signals as well as lower velocity signals having $\Delta t$ values greater than 2 milliseconds per trace are cancelled out or greatly diminished. In FIG. 3B, a velocity trace 54 is shown as would be taken with a velocity filter having a wider spread of cut-off velocity or a $\Delta t$ of 3 milliseconds per trace. Hence, the velocity traces 56 and 58 indicate the presence of valid events, the signal groups 46 and 48 of FIG. 2. Likewise, a trace 60 of FIG. 3C, taken with a velocity filter having a $\Delta t$ value of 6 milliseconds per trace, indicates pulses 62, 64 and 66 representative of the valid event groups 44, 46 and 48 of FIG. 2 which have velocities or $\Delta t$ values of 5, 2.5 and 0 milliseconds per trace, respectively.

As previously stated, the velocity filtering concept was employed in the well-known wavelength filters which employed predetermined detector spacing for cancelling certain seismic return signals crossing the detector array at an angle creating an undesired signal path. This type of wavelength filter was effective mainly to minimize surface and near surface seismic signal return. Velocity filtering as set forth herein utilizes the principle of an adjustable wavelength, controlled to track in accordance with a predetermined frequency of input signal to the earth, so that all return may be rejected which has an apparent velocity $V_a$ less than a predetermined cut-off velocity $V_0$.

Velocity filtering may be effevted by any of several operations by utilizing a concept of an apparent velocity which requires two dimensions for its characterization. Filtering may be carried out utilizing an operator in the space-time domain.

$$V = \frac{d}{t}$$

where $V$ equals velocity and $d$ equals the spacing between adjacent seismometers in the detector array; or, in the space-frequency domain $$V = f\lambda$$

where $f$ equals frequency and $\lambda$ equals wavelength; or, by using the wave number and frequency relationship where $$V = \frac{f}{k}$$

$k$ representing the wave number or reciprocal of wavelength. The present method and apparatus is concerned with the utilization of the space-frequency operator for application in the velocity filtering of multiple traces of seismic information. The space-frequency operator enables the synthesis of different frequency distortions for different offsets along the detector array such that the addition of the multiple of frequency distorted traces of the different offsets amount to different weighted arrays for the different frequency bands under consideration.

The equation $$G(X, f) = \int_{\frac{|f|}{V_0}}^{\frac{|f|}{V_0}} e^{-2\pi i k X} dk \qquad (1)$$

is one which is generally recognized in the art as being representative of a space-frequency operator G (X,f) where $V_0$ is the lower limit or cut-off velocity, $f$ represents the maximum frequency to be encountered, X is equal to the distance along the array profile or the offset from the center of the array, and $k$ is representative of wavenumber, a reciprocal of frequency wavelength. The space-frequency operator G(X, f) in Equation 1 above can then be integrated to yield $$G(X,f) = \frac{\sin\left(2\pi X \frac{|f|}{V_0}\right)}{\pi X} \quad (2)$$

and whenever a predetermined cut-off velocity $V_0$ is selected the Equation 2 becomes $$G(X,f) = \frac{\sin 2\pi c f X}{\pi X}$$

where the cut-off velocity $V_0$ becomes constant ($c$) for each frequency $f$ and offset distance or array spacing X which occurs in the range of consideration. It should be apparent too that for a predetermined frequency $f$ and array spacing X the equation can be further reduced to constant factors.

FIG. 4 shows a plot of the space-frequency operator G (X,f) for an apparent velocity or $\Delta t$ of 6 milliseconds per trace. The abscissae are graduated in frequency from zero to 100 cycles per second which includes the usual range of vibrational seismic energy output. That is, the vibrational transducer is preferably operated through either an upsweep or downsweep between, for example, 10 and 90 cycles per second. The ordinate of FIG. 4 is graduated in space or the space offset X of the particular detector array. The velocity filter employs weighting of the detector array from a center point, for example, midway between trace 6 and trace 7 of a twelve trace seismogram. Throughout this specification, reference to seismic signal traces or channels by their number is the same as a reference to a particular seismic signal and its points of detection in the detector array. Further, a twelve trace seismogram (as shown in FIG. 2) is employed for purposes of illustration but it should be understood that any number of traces or signal channels could be used to compile a velocity filtered trace. However, it can be generally stated that the more traces employed, the greater the cancellation of random components present in the traces.

In accordance with velocity filtering techniques, the filtering operator is applied with respect to the multi-trace seismogram about the mid-point of the seismogram. That is, for a twelve trace record, a point half way between traces 6 and 7 which point by itself is an accurate indication of the travel time of a particular valid event present across a seismogram if it can be isolated. Thus, for the middle two of twelve traces, traces 6 and 7, the space-frequency operator is shown by the line 70, gradually increasing from zero cycles per second to a high value at the higher frequencies. Trace 72 shows the operator for the next adjacent outward traces 5 and 8. The operator or trace 72 is increased in frequency and attenuated in amplitude. Similarly, the operator traces 74, 76, 78 and 80, for the increasingly more outward trace pairs 4 and 9, 3 and 10, 2 and 11, and finally 1 and 12, each show an increase in frequency and a reduced amplitude as the operator analysis moves to the successively more outward trace pairs.

The application of the space-frequency operator of FIG. 4 to their respective traces or channels enables better attenuation of undesired events since each of the traces is frequency distorted differently according to its respective offset (from the center of the array) and the resulting distorted traces can be complementarily added together. That is, the distortions of the events within the velocity passbands are connected in the addition of the frequency distorted traces, while events falling outside the velocity passband are more optimally rejected than would be possible with just a straight addition of the original traces with no frequency distortion interjected. It should be noted here that the operators of FIG. 4 only hold true for a $\Delta t$ or velocity cut-off of 6 milliseconds per trace, the frequencies of the respective operators decreasing ratably with a decrease in the $\Delta t$ of the filtering system. For example, at $\Delta t$ of 2 milliseconds per trace, the operator frequencies are about one-third of those depicted in FIG. 4.

FIG. 5 shows the array weighing at $\Delta t$ of 6 milliseconds per trace which must be set into the detector array for each of the different frequency bands between zero and 70 cycles per second. These values can be deduced from the space-frequency operator graph of FIG. 4 for each of the desired frequency bands. FIG. 5 shows a series of 10 cycle per second (width) frequency bands each represented by its respective weighting factor as it would appear across the detector array or traces 1 through 12 of the seismogram. The relative size of the weights from the center of the array to either end can be determined from the space-frequency plot by traversing vertically along the desired frequency ordinate of FIG. 4. For example, the 60 to 70 cycles per second weighting curve of FIG. 5 could be determined by inspection of FIG. 4 as follows. The trace weights for traces 6 and 7 (detectors No. 6 and 7 of a twelve detector array) would be represented by the point 82 on curve 70 (FIG. 4) between the 60 and 70 cycles per second ordinates. Similarly, the traces 5 and 8 would be weighted in accordance with the relative value of point 84 while the points 86, 88, 90 and 92 would yield the same values for traces 4 and 9, 3 and 10, 2 and 11 and the outer traces 1 and 12. Thus, moving vertically on the space-frequency plot determines for a given frequency the relative weights of that frequency for different offsets across the detector array. Therefore, in summing the traces which have been distorted differently for different offsets, it is possible to obtain a different weighted array for each different incoming frequency.

It has been determined that a maximum rejection of undersired velocity paths can be achieved using an ideal velocity filter which employs a $$\sin x/x$$

weighting of the array (as in FIG. 5) centered about a point midway between the central two of a family of seismic traces. That is, when using the twelve trace seismogram the weighting array is centered between traces 6 and 7. Then after transformation by the respective space-frequency operator, each trace or channel pair will have a sinusoidal weight as a function of frequency with a fixed ratio of peak amplitude and a fixed ratio of frequency. Thus, the transformation of each trace pair by its respective space-frequency operator effectively amounts to the weighting or attenuating of the ground detector array as a function of time in order to change the effective length of the detector array to optimally accept only preselected frequency wavelengths.

The block diagram of FIG. 6 shows one form of apparatus which is suitable for carrying out the present method of velocity filtering. The filtering apparatus 100 is depicted with inputs sufficient to accommodate a twelve seismogram; however, a greater number of inputs and individual processing channels could be provided, or, a seismogram having greater than twelve traces could be processed by sequential application of predetermined trace groupings twelve at a time. The apparatus 100 provides a system whereby the gains controlling the contributions to the filtered signal of the various elements of the array are automatically changed to adapt the weighting of the array to the instantaneous frequency of the sweep generated by the vibrational transducer or other input source.

A plurality of dual inputs 102, 104, 106, 108 110 and 112 provide connection of respective trace or seismometer signal pairs into a plurality of amplifiers 114, 116, 118, 120, 122 and 124, respectively. The amplifiers 114–124 may be of a conventional type of seismic amplifier having fixed gain and being capable of accurate calibration to enable predetermined signal measurement. The output of the amplifiers 114–124 is then available across a plurality of output transformers 126, 128, 130, 132, 134 and 136, respectively.

The output transformers 126–136 have each of their respective secondaries 138, 140, 142, 144, 146 and 148 connected to the opposing sides of a plurality of sine function potentiometers 150, 152, 154, 156, 158 and 160. The sine function potentiometers 150–160 may be any type of conventional potentiometer wherein the resistance element is formed to provide an output voltage variation conforming to the sine function with uniform wiper contact movement. These potentiometers are commercially available for adaptation to a rotational drive as will be further described. Dealing particularly with the sine function potentiometer 160, the end leads 162 and 164 of the secondary winding 148 are connected to the opposite resistance points 166 and 168. The points 170 and 172, at the remaining, opposite quadrants of the sine potentiometer 160, are connected to ground as is the center tap 174 of secondary winding 148. A wiper element 176 is suitably maintained in rotational contact with the sine potentiometer 160. The remainder of the sine function potentiometers 150 through 158 are connected in identical circuit configuration to that shown for the sine function potentiometer 160. That is, each of the sine function potentiometers 150 through 158 receives amplified dual trace signal input from the respective secondaries 138 through 146 of the coupling transformers 126 through 134.

The respective wiper elements 176 and the others (not shown) of the sine function potentiometers 150–160 are each rotatably driven by the mechanical drive connections shown by dash lines 180, 182, 184, 186, 188 and 190. The drive speed or turns ratio of the mechanical drive elements 180 through 190 is progressively increased at a rate adhering to the function $2N-1$. These increasing drive speeds are provided by means of the respective gear boxes 192, 194, 196, 198, 200 and 202 interlinked by the common synchronizing drive linkage provided by the mechanical interconnections 204, 206, 208, 210 and 212. The primary rotational movement is obtained from a drive linkage 214 under the control of a position servo 216. The mechanical drive system imparts increasing rotational drive to the respective sine function potentiometers 150 through 160 at a progression of $2N-1$, or turns ratios of 1, 3, 5, 7, 9 and 11 as shown; and it should be understood that when a greater number of seismic traces are being processed the progression may be extended to maintain the proper rotational speed relationship with any respective additional potentiometers. Further, while the FIG. 6 showing illustrates a common reference speed on shaft 214 and the extension shafts 204 through 212 with gear boxes 192 through 202 providing the full ratio transgression, it may be feasible or even preferable to provide a series of individual ratio transgressions between the gear boxes 192 through 202 on the extension drive members 204 through 212. This would be a matter of design choice, depending upon considerations of space, hardware and the utilization of existing equipment.

The position servo 216 may be a conventional type such as a D-C motor energized to drive to a position proportional to a control signal developed in a sweep generator 218 and a frequency meter circuit 220. The sweep signal generator 218 may be any of the well-known types used for providing a control or reference signal to drive the vibrator unit at the source end of the geophysical system. Or, in the case of laboratory processing, a magnetic record or other replica of the control signal would be employed to provide the necessary sweep signal. The sweep signal generator 218 provides its output on line 222 to the frequency meter circuitry 220. Frequency meter circuitry 220 may be, for example, a suitable one-shot multivibrator which is energized at each cycle of input to generate an output pulse which has a constant pulse height and width. Thereafter, this pulse of constant height and width is averaged in known manner, thus forming a variable D-C control voltage, and then it is applied across an output gain level potentiometer 224. It is desirable that the frequency meter circuitry 220 be a very linear device and that it have a relatively wide frequency range in order that more accurate position servo control may be rendered.

The D-C control voltages present across the potentiometer 224 can be tapped off by means of a wiper element 226 and applied on lead 228 to the position servo 216. A time zone offset voltage circuit 230 also supplies an input voltage on lead 232 to the position servo 216 which is a calibrated D-C voltage that can be adjusted to provide the proper pre-positioning of position servo 216. Hence, this assures the correct positioning of the respective wiper elements of sine function potentiometers 150–160 (as will be further described). A feed back voltage is supplied from a linear follow-up potentiometer 234 and a suitable D-C voltage source (not shown) on a lead 236 to the position servo 216. The linear potentiometer 234 provides a feed back or tracking voltage by virtue of the fact that it receives 1:1 rotational drive through the drive linkage 238 from the rotational drive 180.

The position servo 216 is a conventional D-C motor type of positioning system wherein the control voltage on lead 228 and the time zone offset voltage on lead 232 are summed at the input. The summed control voltage is then compared with the follow-up voltage on lead 236 and the difference is applied to drive the D-C motor (not shown) to the proper null position. The variable D-C voltage across potentiometer 224, varying in proportion to frequency change from sweep signal generator 218, is calibrated with the rotational follow-up output from linear potentiometer 234. Therefore, selection of a portion of the total control voltage through adjustment of potentiometer wiper 226 allows a selection of the angular position produced on the primary drive output 214. This is further equivalent to selection of the cut-off velocity of the apparatus 100 since the respective frequencies of space-frequency operator transformation will thereby be ratably varied to the respective wiper elements of the sine function potentiometers 150–160. This variation in angular position as a function of frequency will determine the cut-off velocity since the individual frequencies of each of the plural space-frequency operators will increase with an increasing velocity passband or $\Delta t$ per trace. Thus, the several space-frequency operators of FIG. 4 which are taken for a $\Delta t$ of 6 milliseconds per trace, would be reduced to about one-third of the frequencies shown in FIG. 4 for the case of a narrower velocity passband or $\Delta t$ of 2 milliseconds per trace.

The time zone offset voltage 230 provides the means by which the apparatus 100 may be synchronized with a desired objective time which occurs on the multi-trace record or input. Since, the apparatus 100 is synchronized with the seismic system sweep signal generator 218, it would only be set correctly to filter signals arriving at zero time. Thus, the time zone offset voltage 230 is calibrated to provide an adjustment whereby the position servo 216 is controlled to pass through its zero or starting point at some desired primary objective time of the seismic traces. The zero starting point would be that positioning of the sine function potentiometers 150–160 where each respective wiper element is positioned at zero or non-weighting resistance on the respective sine function resistances (as shown by wiper element 176). This zero positioning is indicated graphically by the zero frequency ordinate of the space-frequency operator graph of FIG. 4.

During a properly calibrated tracking operation the weighted electrical output from the sine function potentiometers 150 through 160 is taken on the respective leads 240, 242, 244, 246, 248 and 250, each of which is attached to a wiper element of its respective potentiometer 150–160 as exemplified by the wiper 176 connected for output on lead 250. The leads 240 through 250 each connect to a respective attenuation unit 252, 254, 256, 258, 260 and 262. The attenuation units 252 through 262 are each comprised of a pair of series connected resistors having the proper resistance values for providing attenuations which allow signal outputs of unity, one-third, one-fifth, one-seventh, one-ninth and one-eleventh (as indicated in FIG. 6) of the total available voltage at their respective outputs. Each of these attenuated output voltage values is conducted through the respective, suitable isolation resistors 264, 266, 268, 270, 272 and 274; whereupon they are summed on the common input lead 276 into a suitable recording amplifier 278. Thereafter, the signals are amplified and correlated or otherwise prepared for whatever the desired recording or further processing.

In the performance of the velocity filtering method with the apparatus of FIG. 6, a desired seismogram or field array is connected to provide the individual seismic traces into the apparatus 100. The outer traces 1 and 12 of the seismogram are applied at dual input 112 to the amplifier 124. The next two outermost traces 2 and 11 are applied to dual input 110 to the amplifier 122, and successive outer pairs of traces are applied to the dual inputs 108, 106 and 104 to respective amplifiers 120, 118 and 116. Finally, the two innermost traces, traces 6 and 7, are applied at dual input 102 to the amplifier 114, the main signal or the unity (1:1) signal channel.

The respective trace pair inputs are then amplified in the seismic amplifiers 114 through 124 and thereafter coupled through the output transformers 126 through 136 to their respective sine function potentiometers 150 through 160. The sine function potentiometers 150 through 160 are driven at respectively increasing rotational speeds in the ratio of $2n-1$ or at 1, 3, 5, 7, 9 and 11 turns progressively with relation to the primary rotational output 214 from the position servo 216. The sine function potentiometers 150 through 160 translate each of the incoming signals from output transformers 126 through 136 to the respective space-frequency operators, and these operator outputs are applied on leads 240 through 250 to their respective attenuation circuits 252 through 262 which provide the decreasing weights at the ratio of $$\frac{1}{2n-1}$$

moving from the center traces outward. The respective transformed signals are then applied on input lead 276 to a suitable recording amplifier 278 for further processing or final recording. It should be understood that for clarification of indications on the order of FIGS. 3A, B and C, the velocity filtered signals from amplifier 278 would require a correlation procedure. Such procedure is well-known and is the particular subject matter of various patents of the present assignee; for example, U.S. Patent No. 2,989,726 in the name of J. M. Crawford et al. and entitled "Method of And Apparatus for Determining the Travel Time of a Vibratory Signal Between Spaced Points."

The synchronism of the sine function potentiometers 150 through 160 originates with the sweep signal generator 218. Taking the case of a field system, the sweep signal 218 would control the seismic input into the generator 218 would control the seismic input into the earth and thus the direct sweep signal on line 222 to frequency meter 220 could only serve to synchronize zero time trace arrivals at the detector array. Therefore, it is necessary to delay the synchronization of the position servo 216 through the sine function potentiometers 150 and 160 so that their zero rotational position will be correct for a given primary objective time, that point of signal travel time which is of interest to the operators of the apparatus 100. The primary objective time may be determined from a previous shot or other available seismic record of the subsurface.

The time zone offset voltage 230 is used for setting the primary objective time of the apparatus 100. The time zone offset voltage circuit 230 is calibrated in accordance with the apparatus sweep rate and the particular position servo 216 to provide a D-C voltage on lead 232 which, effectively, backs the position servo 216 off by an amount equivalent to the travel time of the desired seismic signals. That is, the travel time of seismic signals from the source downward through the earth to the subsurface point of interest and back upward to the detector array.

The cut-off velocity of the apparatus 100 is set by adjustment of the calibrated potentiometer 224. The upsweep or downsweep of frequency, generally between about 10 and 80 or 90 cycles per second, is applied on lead 222 to frequency meter 230 which provides an output of D-C voltage, the amplitude of which is dependent upon the frequency of input to the frequency meter circuit 220. The velocity cut-off potentiometer 224 further adjusts this voltage amplitude to provide a predetermined rotational position of the primary drive shaft or mechanical linkage 214 which will, in turn, provide the proper frequencies of rotation to the respective sine function potentiometers 150 through 160. In FIG. 4, the space-frequency operators are shown for a velocity cut-off of six milliseconds per trace. However, in the case of a two millisecond per trace space-frequency operator, the respective frequencies of the individual trace sine waves is much less, on the order of one-third of the frequency of FIG. 4. Similarly, the frequencies of the space-frequency operators for the individual traces of a four millisecond per trace cut-off operator are an intermediate value, or a ratio of about 2:3 with respect to the six millisecond per trace operator of FIG. 4. Therefore, the gain control 224, calibrated in accordance with the servo system operation, provides a proper rotational output from position servo 216 to effect the desired velocity cut-off in the filtering operation.

To summarize or collect the operational descriptions, it is necessary to adjust the time zone offset voltage circuit 230 to pre-position the position servo 216 so that, after a delay coordinated with the primary objective time of the seimic traces, the individual rotational wiper elements (e.g. 176) of sine function potentiometers 150 through 160 will be at their proper rotational positions. That is, in the case of an upsweep vibrational signal, the ten cycles per second seismic signal will arrive first at the primary objective time and sine function potentiometers 150 through 160 should each be rotationally positioned to provide the proper space-frequency operator output function. Reading upward on the ten cycle per second ordinate of FIG. 4, the potentiometer relationship can be seen for each of the trace pairs. FIG. 5 further shows the weighted array for the zero to ten cycle per second frequency band, one which requires but little variation due to the long wavelength of ten cycles per second with respect to the detector array. However, it will be noted that as the seismic signal frequencies increase and the wavelengths decrease, there is much greater variation in the sine function weighting of the operators.

FIG. 7 illustrates an alternative system 300 which can be employed for carrying out the wide band velocity filtering method of the invention. The system 300 differs from the system 100 of FIG. 6 in that it can be assembled totally from electronic components; however, it may still prove to be desirable in certain instances to employ electro-mechanical elements, e.g. resolvers or other synchronous generators, in certain of the system stages.

The trace pair inputs from a suitable seismic record or field detector array are applied in the same manner as in system 100. That is, the traces are paired in accordance with their spacing from the center of the seismic record and applied in parallel through the separate channels of the system 300. The trace 6-trace 7 pair is applied at input 302 while the respective or more outward trace pairs are applied to inputs 304, 306, 308, 310 and 312. Each of the inputs 302-312 are applied to respective amplifiers 314, 316, 318, 320, 322 and 324. The amplified trace pair signals are then present at the output of the amplifiers 314-324 on lines 326, 328, 330, 332, 334 and 336 for application to respective modulators 338, 340, 342, 344, 346 and 348. The modulators 338-348 may be any suitable type of double sideband, suppressed carrier modulator such as Hall elements, diode modulators, magneto-resistive or photo-resistive modulators, etc.

Modulation inputs are provided on a series of lines 350, 352, 354, 356, 358 and 360 from a series of respective sine function generators 362, 364, 366, 368, 370 and 372. The sine function generators 362-372 may be similar types of devices which accept an input on the paralleled lead 374 to provide the proper sine function output to the modulators 338-348 as a function of the input voltage. Such function generators are well known devices which have the characteristic that the output voltage must vary as a prescribed mathematical function of the input voltage. Such devices may employ non-linear elements such as thyristors, but the more common type contains networks of diodes and resistances, such that a given function is approximated by a plurality of straight line segments. The adjustment of biases and resistance values will set the junction points and slopes of each consecutive segment so that the output voltage is a function of the input voltage.

The control of the sine function generators 362-372 stems from the frequency of the original input signal to the earth as denoted by control frequency source 376. The control frequency source 376, a direct field recording or other suitable replica, is applied on lead 378 to a counting-type frequency meter 380, similar to the frequency meter 220 of the system 100, to provide a D-C output potential across the velocity cut-off potentiometer 382. A D-C potential, the selected voltage value of which denotes the velocity cut-off of system 300, is then supplied on line 374 to the respective inputs of the sine function generators 362-372. Each of the sine function generators 362-372 is pre-adjusted so that the output sine functions on the respective leads 350, 352, 354, 356, 358 and 360 have frequencies which increase at the rate of $2n-1$. That is, the sine function period ratios are 1, 3, 5, 7, 9 and 11 traversing the channels from the unity output or innermost trace pair handling channel outwardly.

Thus, each of the amplifier trace pair outputs 326-336 is modulated in the modulators 338-348 by the respective space-frequency operator sine function present on leads 350-360 to provide properly weighted outputs on the leads 384, 386, 388, 390, 392 and 394. The unity channel output on lead 384 is applied directly to the input lead 396 for summation into a recording amplifier 398. The remaining channel leads 386, 388, 390, 392 and 394 are applied to respective attenuators 400, 402, 404, 406 and 408 to provide attenuation by the reciprocal of $2n-1$, wherein $n$ is the order of spacing of the respective trace pairs from the center of the seismic record. That is, the attenuator 400, processing the trace 5-trace 8 pair, where $n$ equals 2, attenuates the transformed signal present on lead 386 to one-third $$\left(\frac{1}{2n-1}\right)$$

of its output for application to the lead 396 and recording amplifier 398. The attenuators 402, 404, 406 and 408 provide further attenuated outputs at one-fifth, one-seventh, one-ninth and one-eleventh of the value of their respective transformed input signals.

The plural signals on input lead 396, each weighted and attenuated in accordance with the respective space-frequency operator, are then applied to the recording amplifier 398 where summation and amplification of the velocity filtered seismic information takes place. This seismic information is then applied to a suitable storage medium 410 for permanent storage, play back and further processing, or whatever.

While the system 300 shows 6 trace-pair handling channels it should be understood that the system can be expanded to as many channels as desired, depending upon the number of input traces. Also, a greater number of input traces can be handled with the six channel type of system by stacking predetermined multiples of twelve traces to derive desired velocity signal information. Further, while the attenuators 400-408 are shown as separate stages, it may be desirable in some cases to incorporate the attenuating devices within the modulator stages 338-348.

Also, it should be understood that several alternatives exist which may easily be substituted for the sine function generators 362-372 to provide the necessary modulating inputs to modulators 338-348. For example, it is entirely plausible, and may even be desirable, to employ a pulse generator or other oscillator and a series of frequency dividers for providing the proper modulating functions on lines 350-360.

The operation of the system 300 is similar to the operation of the system 100. The input traces are paired in accordance with their spacing from the center of the seismic record or original detector array and thereafter applied to the channels of system 300 for transformation by the proper space-frequency operator. That is, the potentiometer 382 is adjusted for a particular velocity cut-off point to select a range of D-C voltage excursion as controlled by the frequency of the input from control frequency source 376. This information on lead 374 is applied to the respective sine function generators 362-372, each operating at respectively increasing sine frequencies in the ratio of $2n-1$ to provide their respective outputs on leads 350-360 to the respective modulators 338-348. The trace pair signals present on leads 326-336 are each modulated in modulators 338-348 with the sine function voltages appearing on leads 350-360 to provide an output signal on leads 384-394 which is transformed by its respective space-frequency operator.

Each of the transformed signals on leads 384-394 is then limited to a predetermined output level (equal to the reciprocal of $2n-1$) by the attenuators 400-408, the unity channel lead 384 receiving no attenuation. The properly weighted and attenuated signals are then each applied to the lead 396 for summation into a recording amplifier 398 and subsequent application to the storage medium 410. Here again, the stored vibrational information would require correlation prior to any intelligible viewing or interpretation.

In some cases, it may be that the trace weighting in accordance with the function of $$\frac{\sin x}{x}$$

is not optimum and, in this event, other than the sine fuction may be applied in the same general scheme. While it seems that the potentiometer is the best modulating device, it may be preferable to use Hall multipliers, square-law multipliers, or other known types of double side band, suppressed carrier modulators to achieve the time varying weighting function. Another good possibility is the use of an AGC amplifier with rider control as a programmed gain amplifier when the optimum systems does not require polarity reversal in the weighting function.

The present method and apparatus of velocity filtering is much less complex than the time domain filter which must be applied in the laboratory, and the present system requires far less trace storage on magnetic tape. In some applications it may also be desirable to employ laboratory processing to a narrower filter. This could be achieved if the transformed signals for the respective trace pairs were individually recorded instead of being summed prior to recording.

It should be understood that the present method may be carried out by apparatus other than that specifically shown herein. The disclosed apparatus merely shows one scheme for performing the wide-band velocity filtering method and there are various equivalents well known in the art which may be included in the general scheme. It is particularly desirable from the economy standpoint to utilize existing equipment as much as possible, and the present method enables the inclusion of many existing field equipments in the velocity filtering apparatus.

Changes may be made in the combination and arrangement of steps or elements as heretofore set forth in this specification and shown in the drawings; it being understood that changes may be made in the embodiments disclosed without departing from the spirit and scope of the invention as defined in the claims.

What is claimed is:

1. An apparatus for performing wide band velocity filtering of multi-trace seismic information as detected from a controlled frequency input to the earth by a detector array, comprising:
    a plurality of amplifiers receiving at their inputs selected pairs of seismic traces which pairs comprise traces detected equidistant and opposite from the center of said detector array;
    a plurality of modulating means connected to receive the respective trace pair outputs from each of the plurality of amplifiers;
    means synchronized by said controlled frequency for generating a plurality of modulating inputs for application to said modulating means in accordance with the sine function of respective space-frequency operators, said sine function frequency increasing with the distance of detection of the respective applied trace pairs from the center of the detection array;
    means for receiving the sine weighted trace pair output signals from said modulators for thereafter attenuating the respective weighted trace pair signals by different amounts increasing with the distance of detection of the respective trace pairs from the center of the detector array; and
    means receiving the attenuated trace pair signals at its input to provide a velocity filtered trace at its output.

2. An apparatus for performing wide band velocity filtering as set forth in claim 1 wherein said plurality of modulating means comprise:
    a plurality of double sideband suppressed carrier modulators.

3. An apparatus for performing wide band velocity filtering as set forth in claim 2 wherein said means synchronized by said controlled frequency for generating a plurality of modulating inputs comprises:
    means providing an output at said controlled frequency;
    means receiving said controlled frequency output for providing a D-C control voltage which varies in amplitude with said frequency;
    a plurality of sine function generators each controlled by said D-C control voltage to provide output voltages varying at a sine function in accordance with said trace pair space-frequency operators.

4. Apparatus for performing wide band velocity filtering as set forth in claim 1 wherein said plurality of modulators comprises:
    a plurality of sine function potentiometers including rotary wiper elements each connected to receive one of said respective amplified trace pair outputs and to receive modulating input through the rotational position of the rotary wiper element.

5. An apparatus as set forth in claim 4 wherein said means synchronized by said controlled frequency for generating a plurality of modulating inputs comprises:
    means providing an output at said controlled frequency;
    means receiving said controlled frequency output for providing a D-C voltage which varies in amplitude in accordance with said frequency;
    means receiving said D-C voltage output for providing primary rotational position dependent upon the amplitude of said D-C output voltage;
    means receiving said primary rotation for providing a plurality of rotational drive linkages to the respective wiper elements of said plurality of sine function potentiometers, which linkage rotations increase by the progression $2n-1$ where $n$ is equal to the number of the traces by which said trace pairs are displaced from the center of said detector array.

6. An apparatus as set forth in claim 5 which is further characterized to include:
    means for adjusting the amplitude of said D-C output voltage to vary the rate of rotation from said means providing primary rotation to thereby vary the cut-off velocity of said space-frequency operator; and
    means for pre-positioning said means providing primary rotational output to provide a displacement in the rotational position of said sine function potentiometer wiper elements such that the positioning of the respective wiper elements will be correct for a predetermined primary objective time.

7. Apparatus for performing wide band velocity filtering of multi-trace seismic information derived from detection by a detector array of a controlled frequency input to the earth, comprising:
    a plurality of amplifiers receiving at their respective inputs $n$ pairs of seismic trace signals, each of the pairs originating from detectors which are located at equal spacings from the center of said detector array and $n$ is increasing with progression from the center of the array outward;
    means receiving the $n$ trace pair outputs from said amplifiers for modulating said trace pair outputs such that each of the $n$ outputs is transformed with its respective space-frequency operator function;
    means receiving the $n$ transformed outputs for attenuating the respective outputs by increasing amounts as a function of their distance of detection from the center of said detector array; and
    means for combining the plurality of attenuated outputs to provide a velocity filtered trace output.

8. Apparatus for performing wide band velocity filtering as set forth in claim 7 wherein said means receiving the $n$ trace pair outputs from said amplifiers comprises:
    means providing a control voltage which has predetermined relation to said controlled frequency input to the earth;
    position servo means for providing primary rotational position output proportional to said control voltage;
    means for translating and providing $n-1$ further rotational outputs at ratios increasing by $2n-1$;
    $n$ sine function potentiometers including a rotary wiper element, said $n$ trace pair outputs being applied from said amplifiers to each of said potentiometers, and said primary rotational output and $n-1$ increasing rotational outputs being connected to drive respective wiper elements of said potentiometers to transform the $n$ trace pair signals with their respective space-frequency operator weights.

9. Apparatus for performing wide band velocity filtering as set forth in claim 7 wherein said means receiving the $n$ trace pair outputs from said amplifiers comprises:
    a plurality of means each providing a time varying output which is a function of the space-frequency operator for respective ones of said $n$ trace pairs;
    plural modulator means each receiving one of said $n$ trace pair outputs at one input and one of said $n$ time varying outputs at a second input to produce $n$ transformer outputs, each output being weighted as a function of the distance at which each of the respective $n$ trace pairs was detected from the center of the detector array and the frequency of the seismic trace signals.

10. Apparatus for performing wide band velocity filtering as set forth in claim 9 wherein said plurality of means providing a time varying output comprises:
- means providing a control voltage which has predetermined relation to said controlled frequency input to the earth;
- a plurality of sine function generators each energized by said control voltage to produce a sine function output and each having a frequency increasing in accordance with the distance at which the respective $n$ trace pairs were detected from the center of the detector array.

11. An apparatus for performing wide band velocity filtering of multi-trace seismic information recovered from controlled frequency input to the earth, comprising:
- a multi-trace seismic detector array having pre-determined spacing between units of the array, each unit providing a seismic trace signal;
- a plurality of $n$ amplifiers receiving a pair of traces at respective amplifier inputs, said $n$ pairs being traces which have equal offsets from the center of said array and $n$ being equal to the spacing of said trace pairs from the center of said array;
- a plurality of $n$ coupling transformers including primary and secondary windings each receiving one of said $n$ amplifier trace pair output signals across a primary winding, the secondary of said transformer having a grounded center tap;
- a plurality of $n$ sine function potentiometers each connected across said secondary of a respective coupling transformer;
- a movable wiper element being in contact with each of said $n$ sine function potentiometers;
- means producing a control signal proportional to said controlled input frequency;
- position servo means receiving said control signal and providing primary angular position output proportional of said control signal;
- means connected to said primary angular position output for producing a plurality of $n$ further angular position outputs having a plurality of rotational displacements progressing by the function $2n-1$;
- a linkage means connecting said plurality of $n$ further rotational outputs to drive the wiper elements of said plurality of $n$ sine function potentiometers such that the rotational displacement progression increases with the distance of detection of the respective $n$ trace pairs from the center of the detector array;
- means receiving the $n$ outputs from said wiper elements and attenuating the respective signals by the reciprocal of $2n-1$; and
- means for summing the $n$ attenuated signals to provide a velocity filtered trace.

12. An apparatus as set forth in claim 11 which is further characterized to include:
- means providing an adjustable time zone offset voltage for pre-positioning said position servo means so that the primary angular position is correct for a predetermined primary objective time of said multi-trace seismic information.

References Cited

UNITED STATES PATENTS

| | | |
|---|---|---|
| 3,142,815 | 7/1964 | Picou. |
| 3,274,541 | 9/1966 | Embree _____ 340—15.5 |
| 3,284,763 | 11/1966 | Burg et al. _____ 340—15.5 |

RODNEY D. BENNETT, *Primary Examiner.*

D. C. KAUFMAN, *Assistant Examiner.*